(12) United States Patent
Taylor

(10) Patent No.: US 6,276,389 B1
(45) Date of Patent: Aug. 21, 2001

(54) TOXIC FLUID SAFE RELIEF VALVE

(76) Inventor: Julian S. Taylor, 8300 SW 8th St., Oklahoma City, OK (US) 73128

(*) Notice: Subject to any disclaimer, the term of this patent is extended or adjusted under 35 U.S.C. 154(b) by 0 days.

(21) Appl. No.: 09/544,182

(22) Filed: Apr. 6, 2000

(51) Int. Cl.⁷ .................................................. F16K 17/14
(52) U.S. Cl. ........................ 137/68.11; 137/70; 137/312
(58) Field of Search ............................. 137/554, 68.11, 137/70, 312

(56) References Cited

U.S. PATENT DOCUMENTS

| | | | |
|---|---|---|---|
| 4,724,857 | 2/1988 | Taylor | 137/67 |
| 5,577,523 | 11/1996 | Taylor | 137/70 |
| 5,694,117 | 12/1997 | Sugarek | 340/626 |

*Primary Examiner*—A. Michael Chambers
(74) *Attorney, Agent, or Firm*—Robert K. Rhea

(57) ABSTRACT

A toxic material pressure relief valve is formed by a valve body having a lateral bore and an inline bore forming a fluid passageway intersected by a valve seat in axial alignment with the lateral bore. A bonnet closes the lateral bore and slidably supports a stop in a fluid leak collection chamber and one end of a valve, with the other end of the valve stem normally closing the valve seat. A pin cage axially supports a collapsible pin normally maintaining the valve stem on seat while the working pressure of the toxic material is within predetermined limits.

4 Claims, 1 Drawing Sheet

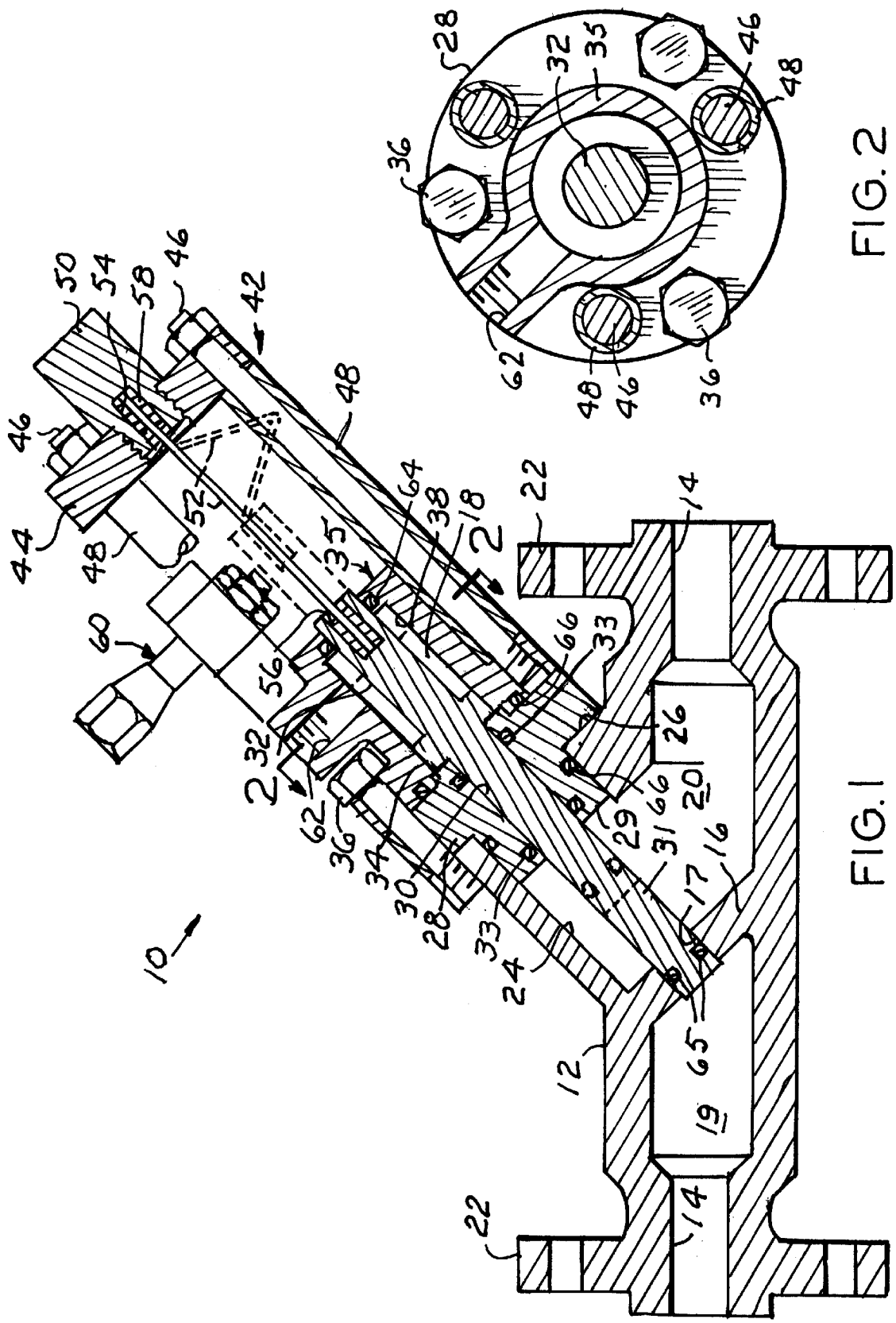

TOXIC FLUID SAFE RELIEF VALVE

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to relief valves and more particularly to a relief valve safely controlling hazardous fluid material under pressure greater than atmospheric.

1. Field of the Invention

One of the problems associated with use of toxic material particularly in gaseous form resides in the ability to control the pressure of such under which such fluids are contained and to safely release that pressure in the event it exceeds a predetermined limit. This valve, it is believed, will provide a safety relief valve which permits toxic fluid under greater than a predetermined limit opens the valve and permits a release of such excess pressure downstream to a toxic safe receptacle from which the fluid can be treated to render it harmless.

2. Description of the Prior Art

U.S. Pat. No. 4,724,857, issued Feb. 16, 1988, to Taylor, for PRESSURE RELIEF VALVE, this patent discloses an Emergency Shutoff Valve, which is responsive to upstream fluid pressure and is monitored by a piston having the upstream fluid pressure on one side of the piston with downstream pressure balanced with a through stem area equal to the piston area. Fluid at set pressure ruptures a collapsible pin to release the upstream fluid pressure to a downstream vent area.

This invention is believed distinctive over the above and similar safety relief valves by monitoring the fluid pressure of toxic material and releasing such pressure to a downstream chamber for safe disposal of fluid leaking past the stem and piston seals during operation. Static seals are reliable but piston and stem seals may leak in operation.

BRIEF SUMMARY OF THE INVENTION

An elongated valve body having bolt flange ends is provided with an inline bore for axially connecting the valve body to a line containing toxic material. An partition angularly disposed with respect to the longitudinal axis of the inline bore divides the valve body to form an upstream toxic containing compartment and downstream exhaust end portion. The partition is centrally bored and its bore is in axial alignment with a lateral opening having its axis inclined downstream with respect to the longitudinal axis of the inline bore. The lateral opening is provided with a centrally bored bushing which slidably receives one end portion of a valve stem characterized by an outstanding flange forming a stop intermediate the ends of the valve stem. A centrally bored and counterbored bonnet is rigidly secured to the outward end of the bushing and forms a leak collecting chamber which longitudinally slidably receives the stop when the valve stem is axially moved relative to the valve body and its partition.

Cage means is axially connected with the valve body bonnet and includes an end plate supporting one end portion of a collapsible pin with the other end portion of the collapsible pin nested by a suitable bore formed in the outwardly directed end portion of the valve stem. A lateral port in the valve bonnet provides discharge for toxic material which might leak by O-rings surrounding the valve stem end portions to be discharged to a safe receptacle, not shown.

Proximity sensor means supported by the valve body bonnet is disposed adjacent the longitudinal axis of the collapsible pin for remote monitoring and alerting personnel to a collapsed condition of the collapsible pin in response to excess toxic fluid pressure against the end portion of the valve stem projecting through the valve body partition bore. The area of this bore is equal to that of the valve stem which is also equal to the valve stem cross-section area projecting through the collection chamber.

The principal object of this invention is to provide an inline pressure relief valve which monitors the working pressure of toxic material and safely releases such pressure when it exceeds a predetermined value and safely discharge a quantity of toxic material without polluting the environment. An additional object being a proximity sensing means for remote determination of whether the valve has been opened or not.

BRIEF DESCRIPTION OF THE SEVERAL VIEWS OF THE DRAWINGS

FIG. 1 is a longitudinal section view through the valve and illustrating, by dotted lines, the position of valve components when released by excess pressure; and, FIG. 2 is a transverse cross sectional view taken substantially along the line 2—2 of FIG. 1.

DETAILED DESCRIPTION OF THE INVENTION

The reference numeral 10 indicates the valve as a whole comprising an elongated valve body 12 having a longitudinal bore 14. The valve bore 14 is transversely enlarged intermediate the ends of the body and provided with a central partition 16 angularly inclined with respect to the longitudinal axis of the valve body defining an upstream toxic fluid containing compartment 19 and a downstream exhaust area 20 for toxic material. Respective end portions of the body 12 are provided with bolt flanges 22 to connect the ends of the valve body with a line, not shown, having toxic material to be pressure monitored.

The valve body is provided with a lateral opening 24 having an axis inclined downstream with respect to the longitudinal axis of the body bore 14 and coaxial with a partition bore 17. The lateral opening 24 terminates in an annular shoulder 26, and is closed by a bushing 28 having a flange en d portion 29 abutting the shoulder 26. The bushing is centrally bored, as at 30 for slidably receiving one end portion 31 of a valve stem, sealed with the bushing bore 30 by seals 33, and having its opposite end portion 32 projecting beyond the bushing and valve stem stop 34. Both stem end areas are substantially equal. A centrally bored and counterbored bonnet 35 is rigidly secured to the valve body as by bolts 36. The counter bore 38 of the bonnet slidably receives the stop 34 and forms a collection chamber 18 for any toxic fluid leaking past the seals 33.

A collapsible pin cage means 42 is axially secured to the valve bonnet 35 and comprises an end plate 44 secured to the valve bonnet 35 by bolts 46 surrounded by spacers 48 to maintain the plate in parallel spaced relation with respect to the valve bonnet end surface. A central socket 54 in a threaded plug 50 nests one end portion of a collapsible pin 52 having its opposite end portion nested by a suitable socket 56 formed in the piston rod end portion 32. Bushings 58 surround the end portions of the collapsible pin for stabilization in the sockets 54 and 56.

A proximity unit 60 supported by the valve bonnet adjacent the collapsible pin 52 remotely determines when the pin 52 has collapsed as a result of excess toxic fluid pressure above a predetermined limit in the upstream chamber 19. The bonnet counterbore 38 is accessed by a lateral bore 62 for exhausting any toxic material therein. O-rings 64 and 65, seal the respective end portions 31 and 32 of the valve stem fluid tight with the bushing 28 and bonnet 35 and the partition bore 17, respectively. Static seals 66 seal the bonnet to the body and toxic chamber to the bonnet.

Obviously the invention is susceptible to changes or alterations without defeating its practicability. Therefore, I do not wish to be confined to the preferred embodiment(s) shown in the drawing(s) and described herein.

What is claimed is:

1. A pressure responsive relief valve for monitoring fluid pressure in a toxic material system, comprising:

a valve body having a lateral bore and having a central inline bore forming a fluid passageway and adapted to be interposed in a fluid line;

a transverse partition dividing the fluid passageway and having a bore axially aligned with the lateral body bore;

stem and stop means in the lateral bore for normally closing the partition bore;

axially bored bonnet means closing the lateral body bore and slidably supporting the stem and stop means and having a counterbore opposite the partition bore forming a toxic fluid leak containing compartment surrounding the stop means; and, axially collapsible pin means for normally maintaining said stem and stop means in fluid passageway closed position and opening the fluid passageway in response to fluid pressure above a predetermined value.

2. The pressure relief valve according to claim 1 in which the stem and stop means incudes:

piston axially disposed in the counterbore; and, a valve stem having axially opposite end portions on the piston respectively axially supported by the bonnet and the wall forming the partition aperture.

3. The pressure relief valve according to claim 2 in which said pin means comprises:

pin cage means including a plate secured to said bonnet means in axial outstanding relation; and, an elongated rod-like pin axially extending between one said stem end portion and said plate.

4. The pressure relief valve according to claim 3 in which said pin cage means includes:

a plurality of post means surrounding said pin in radially spaced relation for connecting said plate with said bonnet.

* * * * *